United States Patent [19]
Oughton et al.

[11] 4,200,830
[45] Apr. 29, 1980

[54] SERIES RESONANT BATTERY CHARGER AND CONTROL THEREFOR

[75] Inventors: George W. Oughton, Horsham; Glenn J. Smollinger, Cornwells Heights, both of Pa.

[73] Assignee: ESB Incorporated, Philadelphia, Pa.

[21] Appl. No.: 823,249

[22] Filed: Aug. 10, 1977

[51] Int. Cl.² .................... H02J 7/10; H02M 3/315
[52] U.S. Cl. ........................... 320/32; 320/39; 320/DIG. 2; 363/28; 363/57
[58] Field of Search .................. 320/21, 29, 31, 32, 320/33, 39, 40, 57, 59, 60, DIG. 2; 363/28, 57, 135

[56] References Cited

U.S. PATENT DOCUMENTS

| | | |
|---|---|---|
| 3,379,954 | 4/1968 | Hehenkamp . |
| 3,406,327 | 10/1968 | Mapham et al. |
| 3,629,681 | 12/1971 | Gurwicz ............................. 320/21 |
| 3,656,046 | 4/1972 | Parke ................................. 320/59 |
| 3,760,258 | 9/1973 | Percorini et al. . |
| 3,938,020 | 2/1976 | Bourke ............................. 320/59 X |
| 3,953,779 | 4/1976 | Schwarz . |
| 4,016,473 | 4/1977 | Newman ........................... 320/39 X |

OTHER PUBLICATIONS

U.S. Gov't. Tech. Report AFAPL-TR-77-45, "A 10 kw Lightweight D.C. Converter", 11/77, Schwarz.

*Primary Examiner*—Robert J. Hickey
*Attorney, Agent, or Firm*—Ewan C. MacQueen; Gary V. Pack

[57] ABSTRACT

An inverting circuit of the series resonant type and including a pair of SCR's operated at variable off-times for controlling the charging of a battery. A control circuit is provided for gating the SCR's at appropriate times in response to sensed circuit current, and battery voltage. Instantaneous resonant circuit current is monitored to derive timing information for firing the SCR's and for anticipating commutation failures.

21 Claims, 3 Drawing Figures

SERIES RESONANT BATTERY CHARGER AND CONTROL THEREFOR

BACKGROUND OF THE INVENTION

The present invention relates to battery chargers, and more particularly to improved control means for operating thyristors in the charging circuit thereof.

Many circuits have been developed for the purpose of charging batteries, and particularly for transferring energy from an AC power source, such as utility power lines, to a battery. In principle, devising a circuit which will transfer charge is quite straightforward; however, it is difficult to properly control the charging rate for various batteries having different characteristics and states of charge. With the advent of the thyristor, and particularly the SCR, control of current rectification and thus of battery charging current has been increased considerably. As a result, battery charging circuits using SCR's have become commonplace and a great deal of effort has been expended in devising control circuitry for SCR's.

One major problem in controlling SCR operation is the necessity of commutating the SCR. As is well known, SCR's will ordinarily not conduct current in a forward direction unless and until an appropriate current signal is applied to their gate terminals. Once the SCR begins to conduct it remains in a conducting state, even after the gating signal terminates, as long as the SCR is forward-biased and a minimum amount of current flow continues. Thus the SCR can only be commutated by an outside mechanism, which in effect reverse-biases the SCR. Although in principle this operation is relatively simple nonetheless commutation failures occasionally occur, and it is therefore necessary that an acceptable SCR control system somehow monitor and accommodate this contingency. While various systems have been devised to this end, they usually add considerable expense and complexity to the control circuit. Coupled with the requirement for recognizing commutation failure is the need to vary the current passed by the SCR to the battery charging circuit. This is ordinarily done by varying the point at which the SCR is gated on, thus varying the total conduction angle or on-time for each period. By varying the time and/or frequency at which the SCR is gated, the charging of a battery can be controlled.

In order that battery charging proceed properly, it is further necessary to monitor the charging current and battery voltage, and to feed back information regarding them to the SCR control circuit so that the gating of the SCR's can be varied in response to perceived current and voltage conditions. Where multiple SCR's are used and circuit resonance is relied upon for commutation, it is especially necessary that triggering of successive SCR's be accomplished only at such times as will not interfere with the commutation of the previously-gated thyristor.

It will be recognized that in order to accommodate all of the various constraints upon the operation of thyristor-controlled battery charger circuits, a functionally complex control circuit is necessary. At the same time, however, from a commercial point of view it is desirable to minimize the actual amount of circuitry both to minimize the size of a battery charger, and more importantly, its cost.

For all of the foregoing reasons, it will be recognized that it would be extremely advantageous to provide a control system for a thyristor-operated battery charger which achieves satisfactory voltage and current regulation, timing, and commutation failure recognition in a simplified and less expensive manner.

It is accordingly an object of the present invention to provide an improved battery charging system of the thyristor-operated type.

It is yet another object to provide an improved system for controlling thyristors in a battery charger system.

Another object is to provide a system for facilitating the clearing of a commutation failure in a resonant battery charging circuit including one or more thyristors.

A further object is to provide simplified control means for anticipating commutation failures in the thyristor circuit of a battery charger.

SUMMARY OF THE INVENTION

Briefly state, in accordance with one aspect of the invention the foregoing objects are achieved by providing a resonant charging circuit having a pair of alternately-conducting thyristors, and means for sensing current flowing in the resonant circuit. A fault anticipation circuit having hysteresis monitors the instantaneous current and outputs a thyristor-firing signal in response to the attainment of sensed current of a first, higher level and its subsequent diminution below a second, lower level. The firing signal is processed by a variable time delay stage whose operation is controlled in response to both sensed resonant circuit current and battery voltage, and the resulting trigger signal used to operate a gating circuit for alternately firing the thyristors.

In a preferred embodiment, second current monitoring means are provided for sensing a sudden overcurrent due to an apparent short circuit, commutation failure or the like in the resonant circuit and inhibiting further gating signals. A delayed-restart stage reintroduces a restart firing signal a fixed period of time after cessation of gating due to a sensed fault current.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
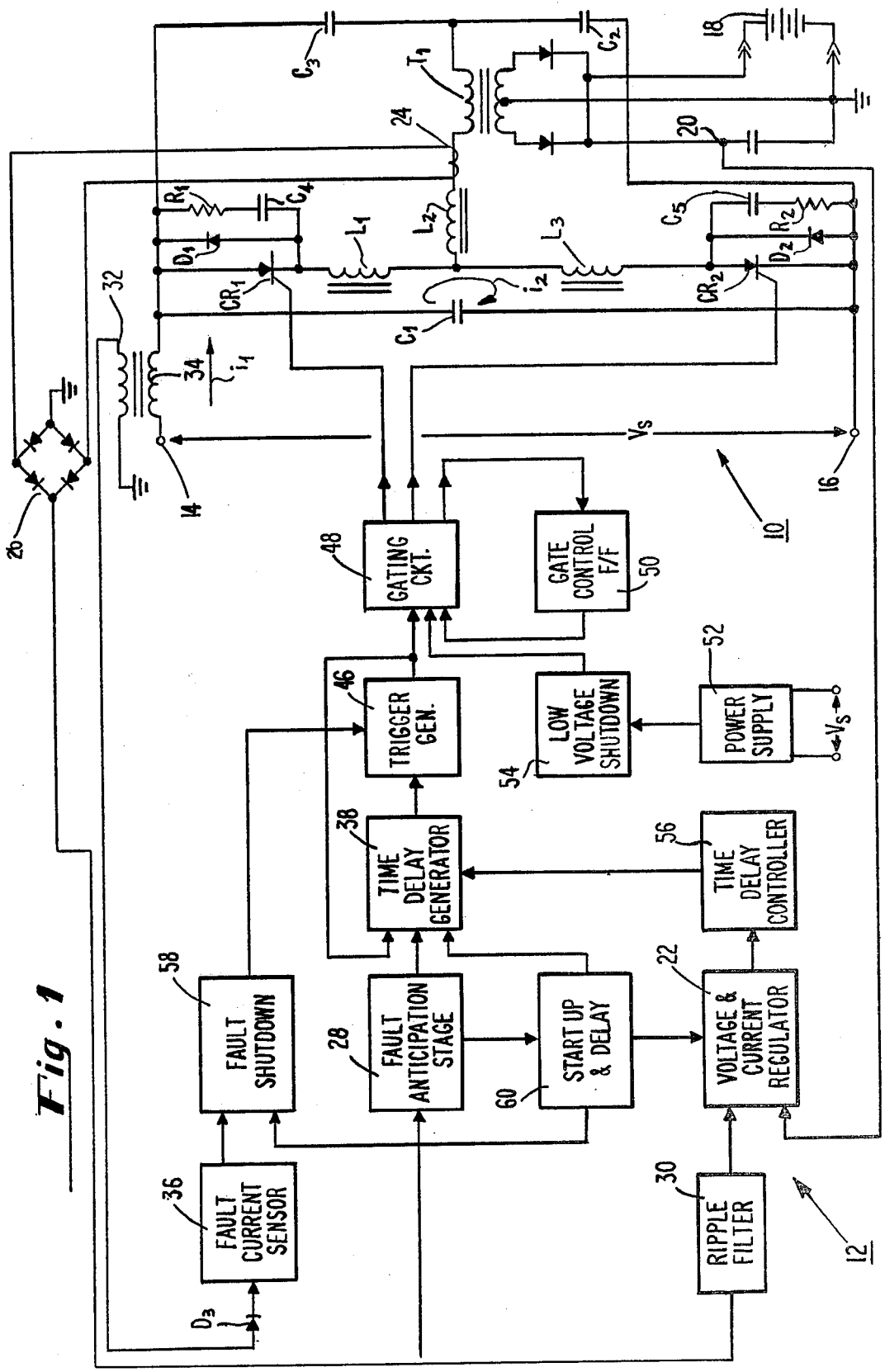
FIG. 1 is a schematic diagram of a charging circuit, illustrating functional details of the thyristor control portion thereof.

According to FIG. 1 there is depicted a battery charger system which generally comprises a series resonant power circuit 10 and a control circuit 12. A source of supply voltage $V_s$ is coupled across input terminals 14, 16 as indicated for supplying power to the system. In a typical application the power will be supplied from a rectification stage, such as a bridge circuit, coupled to AC power lines. In a preferred application three-phase power is utilized, although two-phase and single-phase power may also be used if convenient. The power circuit is one generally termed a series resonant converter, and of a type well known to those skilled in the art. The operation of such systems is well known and is disclosed, for instance, in the Silicon Controlled Rectifier Manual (Fifth Ed.) by the General Electric Company; "A Controllable Secondary Multikilowatt DC Current Source With Constant Maximum Power Factor in its Three-Phase Supply Line" by Schwarz and Klaassens, Proceedings of the IEEE Power Electronics Specialists Conference, 1975; and "An Improved Method of Resonant Current Pulse Modulation for Power Converters", by F. C. Schwarz, IEEE Transactions on Industrial Electronics and Control Instrumentation, Vol. IECI-23, No. 2, May 1976. Basically one or more pairs of thyristors, such as SCR's $CR_1$ and $CR_2$, are alternately energized to maintain oscillations in a resonant circuit. In the illustrated embodiment, for example, $CR_1$ may first be energized by an appropriate gating signal to cause current to flow through inductors $L_1$ and $L_2$, then through primary winding of transformer $T_1$ to charge capacitors $C_2$ and $C_3$. Ultimately the voltage on capacitors $C_2$ and $C_3$ will build up to a value adequate to support a "ringback", or resonant reversal, of the system current. The series combination of inductors $L_1$ and $L_2$ and capacitors $C_2$ and $C_3$ resonate in a manner commonly understood and encourage a current reversal which flows through diode $D_1$. The reversed current also back-biases thyristor $CR_1$, causing it to commutate. The current oscillates about the circuit to charge capacitors $C_3$ and $C_2$. The series combination of resistor $R_1$ and capacitor $C_4$ is used along with $L_1$ and $L_3$ as a snubber to limit the rate of rise of voltage across $CR_1$.

Subsequent to the commutation of first thyristor $CR_1$, a second gating signal is applied to the gate terminal of second thyristor $CR_2$. Assuming that this occurs during the resonant reversal just described, current is diverted away from inductor $L_1$ and caused to flow through inductor $L_3$. At the same time current is drawn from capacitors $C_3$ and $C_2$, causing the voltages across the latter to increase and decrease, respectively.

Eventually the circuit including capacitor $C_3$, the primary winding of transformer $T_1$, and inductors $L_2$, $L_3$ gives rise to another resonant reversal of current. This reversal again charges capacitors $C_2$ and $C_3$ through a circuit loop which includes diodes $D_2$. At the same time the current reversal back-biases, and therefore commutates, thyristor $CR_2$. As with the first thyristor, a snubber circuit including a resistor $R_2$ and capacitor $C_5$ is provided and acts in conjunction with $L_1$ and $L_3$ to limit the rate of voltage rise across $CR_2$.

By continuing to alternately gate thyristor $CR_1$ and $CR_2$, it will be understood that a flow of alternating current can be maintained through primary winding of transformer $T_1$. By varying the frequency at which the thyristors are triggered the value of the resonant current can be controlled and accordingly a greater or lesser amount of "outside" current can be delivered to the circuit.

Energy is transferred from the oscillating circuit to the battery circuit by transformer $T_1$. Current from the transformer, herein depicted as a center-tapped transformer with full-wave rectification, is applied to a battery 18 which is coupled to the circuit by suitable connectors. Accordingly, the battery voltage at any given time can be monitored at point 20 in the battery circuit.

Point 20 is coupled to voltage and current regulator stage 22 of control system 12. At the same time, the instantaneous magnitude of the resonant current in the charger power circuit is sensed by means of a current transformer or similar pickup winding 24. The current signal is rectified as for instance by means of a bridge rectifier 26, and applied to a fault anticipation stage 28 in the control circuit. At the same time, the current signal is applied to voltage and current regulator stage 22 through a ripple filter 30.

In a preferred embodiment, another input to the control circuit is supplied by means of a sensing winding 32 formed upon an inductor generally designated 34. The signal thereby sensed represents current flow from the voltage source $V_s$ into the battery charger power circuit. The current signal is applied through a rectifier such as diode $D_3$ to a fault current sensor 36.

From an inspection of FIG. 1 it will be apparent that the simultaneous conduction of thyristors $CR_1$ and $CR_2$ will give rise to an apparent short circuit across the voltage source. Such an occurrence would arise, for instance, when one of the thyristors has failed to commutate. In this event the thyristor will remain "on" and when the second thyristor is gated in the normal manner current will flow downwardly through $CR_1$, $L_1$ and $L_3$, then through thyristor $CR_2$. While inductors $L_1$ and $L_3$ will resist an initial surge of current, they will not limit the amount of current which can eventually flow and accordingly destructively high current levels may be reached. Although it is conventional to couple circuit breakers and the like to the system, the response time of high-current circuit breakers is not sufficiently rapid to protect the circuit under all circumstances. Even if special SCR's are selected which will withstand temporary overcurrent conditions, the need to manually replace fuses or reset circuit breakers will occasion a substantial shutdown time.

The present system includes means for overcoming this problem, and resonantly commutating the SCR's after they have both begun to conduct. This material is disclosed and claimed in copending U.S. patent application Ser. No. 823,254, now abandoned. By connecting a capacitor $C_1$ about the thyristors to form a circuit loop, and by coupling an inductive choke 34 in series between the loop and the voltage supply, commutation of faulted SCR's may be achieved automatically. Capacitor $C_1$ normally serves as a filter capacitor in a manner familiar to those skilled in the art. When supply voltage is first applied to the circuit capacitor $C_1$ charges, and maintains its charge while thyristors $CR_1$ and $CR_2$ are alternately gated. A small amount of charge flows to and from the plates of capacitor $C_1$ on each cycle, so that the capacitor lessens the ripple across the voltage supply in the manner of a conventional filter capacitor.

With conventional systems should the series thyristors $CR_1$ and $CR_2$ conduct simultaneously capacitor $C_1$ would immediately discharge through them, adding to the current flowing from the voltage supply. The current $i_2$ from capacitor $C_1$ will flow around a circuit loop comprising the capacitor, thyristor $CR_1$, inductors $L_1$ and $L_3$, and thyristor $CR_2$. The large, continuing flow of current from the voltage supply will soon injure or destroy circuit components, possibly including the thyristors.

By providing a choke inductor 34, and properly adjusting the relative values of the choke and of capacitor $C_1$ the foregoing effect can be overcome. When thyristors $CR_1$ and $CR_2$ become conductive the impedance of choke inductor 34 prevents a sudden inrush of current, and accordingly the current $i_2$ which begins to circulate about the above-mentioned circuit loop is only slightly damped. The voltage on capacitor $C_1$ then reverses in the usual resonant manner, and current $i_2$ similarly reverses. The reverse flow of current in the loop, which may include diodes $D_1$ and $D_2$, commutates the thyristors by back-biasing them and thus prevents a destructively high current from flowing in the circuit.

Current flow through choke inductor 34 begins to increase as soon as the fault occurs; that is, when the thyristors both become conductive. However, due to the inductance of the choke the rate of increase of the supply current $i_1$ is limited so that resonant reversal of loop current $i_2$ can proceed before $i_1$ rises to a level which would overcome resonant current reversal.

Turning now to the control circuit, firing signals are outputted by fault anticipation stage 28 in response to the sensed current flow in the resonant power circuit. The firing signal from the fault anticipation stage is processed by a time delay generator 38, and a properly-timed trigger signal transmitted to trigger signal generator 46. The trigger signal then serves to operate gating circuit 48, which alternately gates thyristors $CR_1$ and $CR_2$ in accordance with the state of gate control flip-flop 50. A local power supply 52, advantageously operated from the supply voltage $V_s$, supplies the necessary bias to the various elements of the control circuit and is monitored by a low voltage shutdown circuit 54 which operates to inhibit operation of gating circuit 48 in the event that local power is lost.

The relative timing of the trigger signal is determined by the operation of time delay generator 38, which in turn is controlled by a time delay controller 56. Signals from the latter serve to speed up, or to delay, the production of trigger signals and ultimately the rate at which current is introduced into the resonant power circuit through thyristors $CR_1$ and $CR_2$. Voltage and current regulator stage 22 outputs a signal which governs the operation of time delay controller 56 so that the resulting time delay is modified as a function of both battery voltage and resonant current level.

A fault shutdown stage 58 is responsive to a signal from fault current sensor 36 to inhibit trigger signal generator 46 in the event of a power circuit failure of a type which tends to draw excessive current. Finally, a second time delay means, identified as startup and delay stage 60, is provided to the control system. The startup and delay stage actually performs two functions. First, it introduces a restart firing signal to time delay generator 38 at some time subsequent to the sensing of a thyristor commutation failure by fault anticipation stage 28. Secondly it functions to initialize, i.e., energize in the proper sequence, the various elements of the control circuit so that upon start or restart of the system all elements will function properly.

Figure 2:
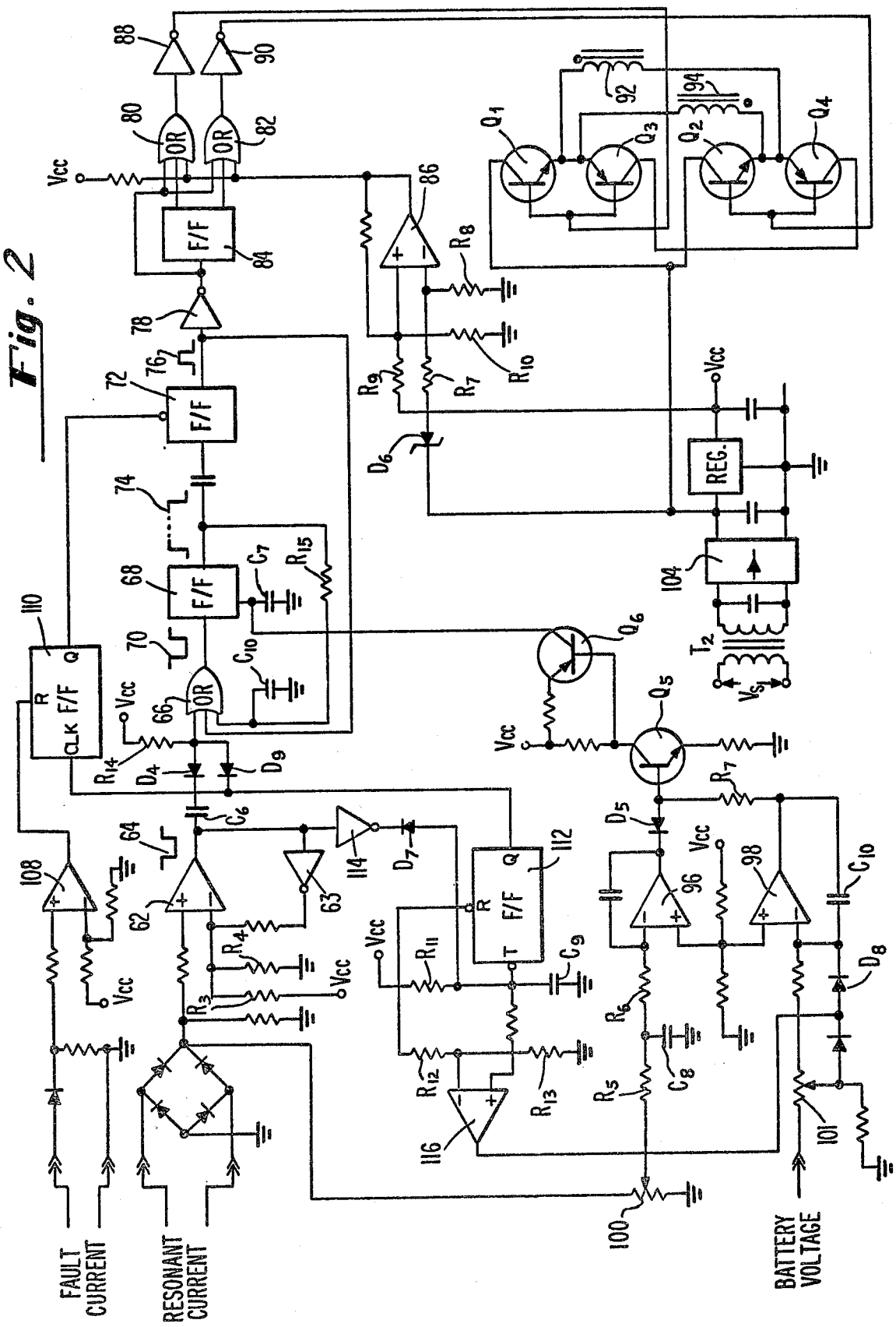
FIG. 2 is a schematic diagram of a preferred embodiment of a thyristor control circuit.

Turning now to FIG. 2, there is shown a detailed illustration of a preferred embodiment of the present invention. Current sensing means applies a manifestation of resonant current to a comparator 62 which comprises an element of the fault anticipation stage. The negative input of the comparator is a fixed reference voltage, herein a fraction of biasing voltage $V_{cc}$ as determined by the relative values of resistors $R_3$, $R_4$. In response to an anticipated zero-crossing of the resonant current comparator 62 is operative to output a firing signal 64, which traverses capacitor $C_6$ and isolation diode $D_4$ and is applied to OR gate 66. Assuming for the moment that all other inputs to OR gate 66 are low, the OR gate applies a negative pulse 70 to the trigger input of a flip-flop 68. A timing capacitor $C_7$ is coupled to the threshold input of flip-flop 68, the voltage thereon serving to determine the time required for the output of the flip-flop to return to its quiescent state (here digital zero). The falling of the signal 74 outputted by flip-flop 68 triggers subsequent flip-flop 72, giving rise to trigger signal 76 of fixed duration. The trigger signal then passes through inverter 78, and is applied to both OR gates 80, 82 of the gating stage of the circuit. At the same time, the trigger signal from inverter 78 impinges upon the CLK input of flip-flop 84, causing the flip-flop to change state and thus alternate digital "1's" and digital "0's" upon OR gates 80, 82. A third, constant digital "0" is applied to the latter OR gates from a low voltage shutdown circuit which includes comparator 86, to be discussed hereinafter.

The toggling action of the gating circuit causes positive-going pulses to be produced by alternate ones of inverters 88, 90. Depending upon which of the inverters is actuated, pairs of transistors $Q_1$ and $Q_4$, or $Q_2$ and $Q_3$, are biased into conduction. This causes triggering current to flow in pulse transformer windings 92, 94 for triggering thyristors $CR_1$ or $CR_2$, respectively.

The time delay which is afforded by flip-flop 68 as a consequence of the voltage on capacitor $C_7$ is controlled by the voltage and current regulator stage, and more particularly by the states of comparators 96 and 98. The current signal abstracted from the resonant power circuit by sensing winding 24 is applied through a calibrating potentiometer 100, and by way of a ripple filter including resistors $R_5$, $R_6$ and a capacitor $C_8$, to the negative input of current regulating operational amplifier 96. The positive input of the amplifier is coupled to a point of biasing potential $V_{cc}$ through an appropriate voltage divider and the output of the amplifier coupled to subsequent circuitry by way of isolating diode $D_5$.

The negative input terminal of voltage regulator amplifier 98 receives a battery voltage signal through a resistive network including a calibrating potentiometer 101. The voltage reference signal derived from bias voltage $V_{cc}$ is applied to the positive terminal of the comparator. The comparator output then flows to subsequent utilization circuitry through a resistor $R_7$. In a preferred embodiment the utilization circuitry takes the form of a buffer and current source comprised of transistors $Q_5$ and $Q_6$ which are connected in amplifying relationship, and biased by voltage $V_{cc}$.

Source voltage $V_s$ is applied to the primary winding of a transformer $T_2$ and rectified by an appropriate rectifier stage 104. The resulting DC supply voltage, approximately 25 volts in a preferred embodiment, is applied to the negative input terminal of comparator 86 through a 4.7 volt Zener diode $D_6$, and a voltage divider including resistors $R_7$, $R_8$. In this manner a reference voltage of approximately 10 volts is applied to the negative input terminal of the comparator. An active voltage regulator 106 is also provided, and operates upon the rectified 25-volt source to output a biasing potential $V_{cc}$ of approximately 15 volts. The latter voltage is reduced by a voltage of approximately 7.5 volts at the positive input terminal of comparator 86.

In a preferred embodiment a fault current detector is comprised of a comparator 108, the negative input of which receives a reference voltage derived from $V_{cc}$. The positive terminal receiving an output from the current sensing winding 32 is illustrated in FIG. 1. The output of the comparator is applied to the reset terminal R of flip-flop 110, while the output of the flip-flop is coupled to the reset terminal of flip-flop 72 for inhibiting the latter.

Finally, a startup and delay circuit for resetting, and for properly initializing, elements of the control circuit is provided. The latter includes a flip-flop 112 whose output goes to the CLK terminal of flip-flop 110 and to OR gate 66 through isolating diode $D_9$. A timing capacitor $C_9$ is connected to the triggering input of flip-flop 112, and is constantly charged through resistor $R_{11}$ by bias voltage $V_{cc}$. The intersection of $R_{11}$ and capacitor $C_9$ is coupled to the output of comparator 62 through diode $D_7$ and inverter 114.

Capacitor $C_9$ is also coupled to the positive input terminal of a comparator 116, the negative terminal of which receives a fixed, reference signal derived from bias voltage $V_{cc}$ by a voltage divider comprising resistors $R_{12}$ and $R_{13}$. The output of comparator 116 is coupled to the negative input terminal of voltage regulator comparator 98 through a diode $D_8$.

The operation of the system of FIG. 2 will now be discussed, making particular reference to the elements enumerated therein and to the timing diagram of FIG. 3 which illustrates the operation of certain of the circuit elements. When the system is first energized no resonant current exists in the power circuit. Current supplied by the voltage source flows downwardly through resistor $R_{11}$ and begins to charge capacitor $C_9$. When the voltage upon the capacitor attains a value which is substantially equal to the reference voltage established by voltage divider $R_{12}$, $R_{13}$ comparator 116 outputs a positive-going signal. The latter, positive voltage forward-biases diode $D_8$ and supplies an increasing potential to the inverting input of amplifier 98. The voltage produced by the latter amplifier is thus caused to drop, discharging feedback capacitor $C_{10}$ and back-biasing transistor $Q_5$. This slows the charging rate of capacitor $C_7$ so that flip-flop 68 is constrained to produce a relatively long pulse signal.

As the voltage on capacitor $C_9$ rises still further it crosses the threshold value of flip-flop 112 and triggers the latter. In this manner a restart pulse is applied through OR gate 66 and the circuit commences to supply charging current to the battery. At the same time comparator 116 applies a signal to amplifier 98 which mimics a high battery voltage condition. Thus, when restart occurs the charging system begins to output current at a very low level. After the system starts capacitor $C_9$ discharges rapidly to remove the positive-going voltage signal at diode $D_8$ and accordingly capacitor $C_{10}$ recharges so that the output voltage of amplifier 98 increases. This in turn allows a more rapid charging of timing capacitor $C_7$ and charging current increases to an appropriate level as determined by the voltage of the battery being charged.

At the same time the negative-going restart pulse from flip-flop 112 traverses isolating diode $D_9$ to provide a digital "0", or low signal, at the uppermost input of OR gate 66. Prior to the operation of flip-flop 112, the uppermost input to OR gate 66 was maintained at a voltage representing a digital "1" due to its connection to bias potential $V_{cc}$ by way of resistor $R_{14}$.

OR gate 66 outputs a negative-going pulse (waveform 2) at time $t_1$ which triggers flip-flop 68 into outputting a positive-going signal (waveform 3). The output of flip-flop 68 stays "high" until time $t_2$ at which capacitor $C_7$ charges through transistor $Q_6$, and the output signal falls to its quiescent value. The dropping of the signal in turn triggers flip-flop 72 to produce a triggering signal 76 (waveform 4) which is applied to OR gates 80, 82. Depending upon the state of flip-flop 84 (which is immaterial insofar as it is of no consequence which of the thyristors is fired first) a positive-going pulse is applied to the bases of either transistors $Q_1$ and $Q_3$, or $Q_2$ and $Q_4$. Assuming for the moment that OR gate 80 is actuated, inverter 88 outputs a positive-going pulse to the bases of transistors $Q_1$ and $Q_3$. At the same time, inverter 90 will maintain a comparatively low-voltage signal at the bases of transistors $Q_2$, $Q_4$. As a consequence, transistors $Q_1$ and $Q_4$ will be biased into conduction so that current flows downwardly through both pulse transformer windings 92 and 94 (waveforms 6 and 7).

As suggested by the polarity dots in FIG. 2, the pulse transformer windings are coupled in reverse parallel relationship. Accordingly, despite the fact that current flows through both windings in the same direction only one of them will be operative to gate its respective SCR. In the present instance, it will be assumed that a downward flow of current will effect the gating of thyristor $CR_1$, to whose gate terminal winding 92 is coupled.

As current flows through the resonant battery charger power circuit, and subsequently reverses as described with respect to FIG. 1, the sensed current rises and falls as shown in waveform 1 of FIG. 3. The inventors have found that in a power circuit of the type depicted, the decline of resonant current below some predetermined value can reliably be used to anticipate the zero-crossing point of the current. Accordingly, as the value of the sensed current diminishes beneath some appropriate value, herein selected to be 1½ amps, it declines beneath the value of the signal at the negative terminal of comparator 62 and the output thereof suddenly drops. A negative-going firing pulse 64 then traverses capacitor $C_6$ and isolation diode $D_4$, and causes OR gate 66 to produce a negative-going signal as described above. The subsequent pulse processing circuitry acts in the manner just described to cause a negative-going pulse to be applied to OR gates 80 and 82, and to the CLK terminal of flip-flop 84. On the rising edge of the pulse the flip-flop changes state so that the previously-actuated OR gate is now dormant, and the previously unactuated OR gate produces a negative-going pulse which eventuates in the conduction of transistors $Q_2$, $Q_3$. In this manner the direction of the current flowing through pulse transformers 92, 94 is reversed and thyristor $CR_2$ is gated on.

It will be appreciated that OR gate 66 will only fall to a digital zero ("low") state if "low" signals are present at all of its input terminals. In fact, the center and lower input terminals will only have a digital "1" present thereon during the time that trigger pulses are outputted by flip-flops 68 and 72. Operation of OR gate 66 will then be inhibited during the duration of the triggering signal outputted by time delay flip-flop 68, as extended by the presence of an RC circuit including a resistor $R_{15}$ and capacitor $C_{10}$. The purpose of the fed-back pulse signals is to prevent spurious signals or noise from triggering OR gate 66 in the absence of a firing pulse from comparator 62.

As stated above, the duration of the trigger pulse outputted by flip-flop 68 is controlled by the voltage upon timing capacitor $C_7$. This voltage is manipulated by the voltage and current regulator stage of the system so as to vary the turn-on point of the thyristors as a function of the voltage across the battery being charged, and the level of current in the resonant power circuit. Accordingly, a relatively high battery voltage appearing at the negative terminal of amplifier 98 of the voltage and current regulator stage results in the production of a negative voltage signal (waveform 10 of FIG. 3), which is applied to the base of transistor $Q_5$. This tends to reverse-bias the latter, eventuating in a lessened flow of current to capacitor $C_7$ through output transistor $Q_6$. The lessened flow of current causes capacitor $C_7$ to recharge at a slower rate, thereby extending the width of the trigger pulses outputted by timing flip-flop 68 and accordingly causing the respective thyristors to fire at a later time. This operation is illustrated in FIG. 3, wherein a lengthened timing pulse (waveform 3) terminates at time $t_3$.

Conversely, when battery terminal voltage is relatively low amplifier 98 produces a more positive signal, which tends to bias transistor $Q_5$ forwardly and increases the flow of current to capacitor $C_7$. Accordingly, the latter is charged at a higher rate and the timing pulses from flip-flop 68 are shorter. It will now be seen that this effects an earlier firing of the thyristors, so that the thyristors remain on for a longer period of time and accordingly more current is injected into the resonant power circuit.

When battery voltage is relatively high isolating diode $D_5$ is reverse-biased so that the state of amplifier 96 has no effect upon the charging rate of capacitor $C_7$, and thus the duration of the trigger pulses. However, with battery voltage at a relatively low level, should a high level of resonant circuit current be detected amplifier 96 outputs a low-voltage signal. This tends to diminish the effect of comparator 98, and reduce the forward bias on the base of transistor $Q_5$. On the other hand, should resonant circuit current be relatively low the signal appearing at the negative input terminal of current amplifier 96 will be insufficient to cause the latter to produce a negative signal, and the forward bias applied to transistor $Q_5$ by voltage amplifier 98 is unaffected.

Turning now to the low voltage shutdown stage, when source voltage $V_s$ declines the 25-volt supply potential outputted by rectifier stage 104 also declines, with a corresponding reduction in the voltage applied to the negative input terminal of comparator 86. While the biasing voltage $V_{cc}$ which is outputted by active regulator 106 will also decline, due to the operation of the active regulator the decline will not be as large as the fall in the supply voltage. As a result when the difference between the supply voltage inputted to regulator 106 and the biasing voltage $V_{cc}$ which it produces declines to approximately 5 volts comparator 86 will change state and output a positive signal which inhibits OR gates 80, 82. This will prevent further gating activity, and effectively inhibit operation of the control circuit until the source voltage is restored to its original value.

The present inventors have found that in practice successful commutation of a resonant circuit inverter of the type described requires the presence of some minimum current in the resonant circuit. Accordingly, for any given system there is some minimum current required for commutation, and if the current does not attain this minimum it is a statistical probability that successful commutation will not occur. Further, if unsuccessful commutation of one thyristor is anticipated it is highly undesirable that the other thyristor be gated. Simultaneous operation of both thyristors would effectively create a short circuit across the resonant power circuit, with resulting damage due to inordinately increased current flow.

Returning to the fault anticipation stage of the control circuit, it will be seen that a positive feedback loop is established around comparator 62 by way of inverting amplifier 63. When the sensed resonant current drops to a sufficiently low level to cause comparator 62 to output a negative-going signal, the signal is inverted and fed back to the negative input terminal of the comparator. This in turn serves to increase the magnitude of the voltage at the negative input terminal so that a greater current is required to thereafter cause the outputted signal to return to its quiescent, higher level. Accordingly, the positive feedback which is thus established gives rise to a hysteresis characteristic whereby the comparator can be forced to a "low" output by a relatively low input signal, but will not be reset to its higher, quiescent state until the input signal has risen to a second, higher level.

Figure 3:
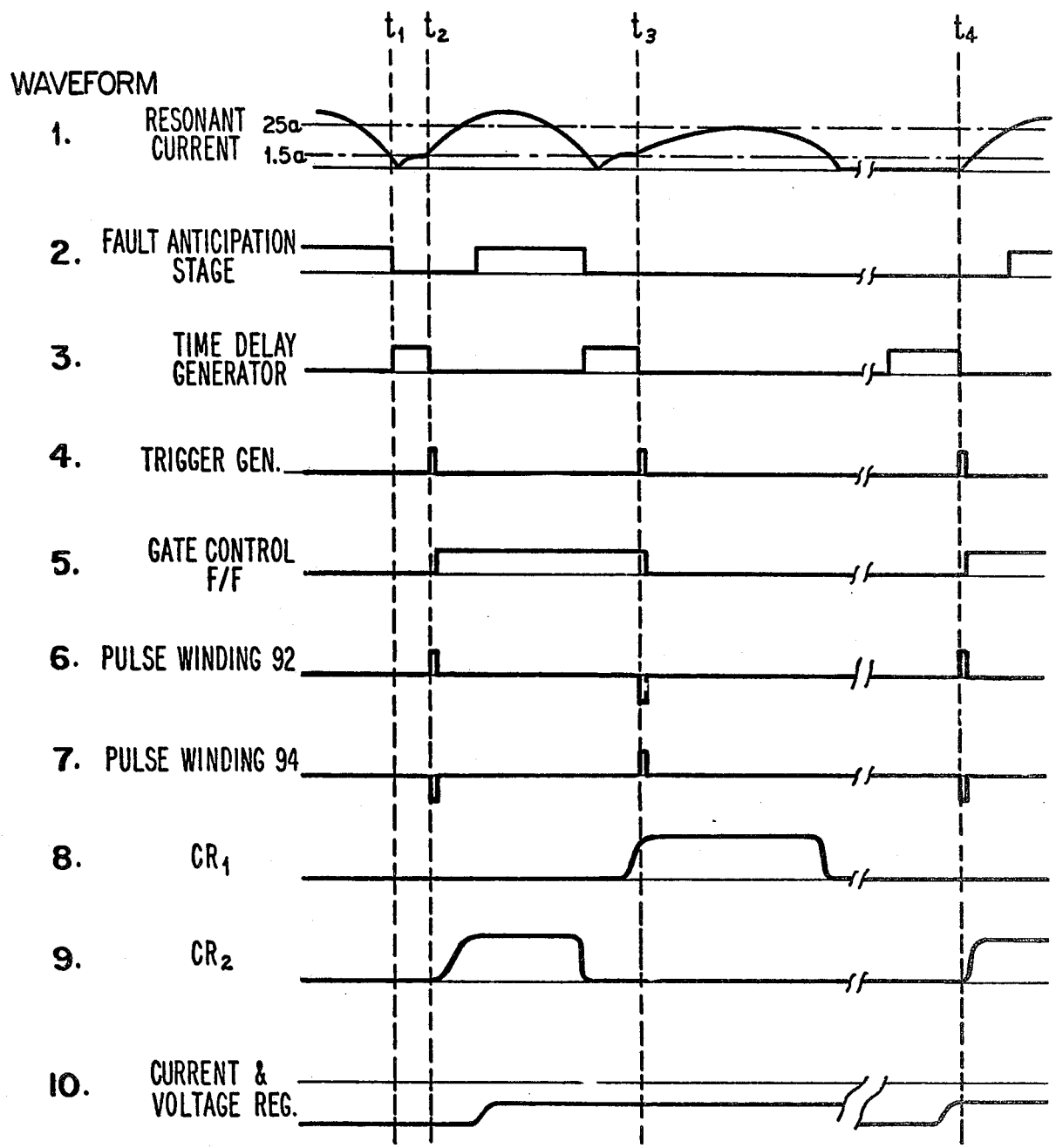
FIG. 3 is a timing diagram containing representative waveforms and illustrating operation of certain elements of the inventive system.

The effect of this operation is apparent from an observation of the uppermost two waveforms of FIG. 3. At time $t_1$ the sensed current signal drops to approximately 1½ amps, whereupon the output of the current sensing comparator 62 falls to its low state. This initiates a firing signal. Due to the positive feedback which is then established to its negative input terminal, the comparator is "latched" and thereupon requires a signal corresponding to a current of approximately 25 amps to cause the comparator to terminate the firing signal by outputting a "high" or positive signal.

The effect of the hysteresis thus provided to the comparator is very significant, inasmuch as it prevents negative-going firing signals from occurring unless each is preceded by a pulse of resonant current having a magnitude of 25 amps or more. In effect, it is the high-valued, resonant current which "resets" the comparator to make subsequent firing signals possible.

As set forth above, a lack of communication is anticipated by the failure of resonant current to attain some minimum value, 25 amps in the present example. When the sensed current shown in waveform 1 of FIG. 3 fails to attain a minimum value of 25 amps subsequent to time $t_3$, its subsequent diminution beneath a minimum value (1½ amps) does not re-trigger comparator 62 due to the hysteresis provided by the feedback loop. Rather the output of comparator 62 stays at a relatively low level, as shown by waveform 2. Inasmuch as comparator 62 and OR gate 66 are AC coupled by means of a capacitor $C_6$, after some period of time current flowing through pull-up resistor $R_{14}$ causes the OR gate to resume its "high" status.

After some relatively long period of time has elapsed, for instance on the order of tenths of a second, capacitor $C_9$ is sufficiently charged to trigger flip-flop 112. The latter outputs a negative-going pulse which is communicated to OR gate 66 through isolation diode $D_9$ as a restart firing signal. This signal in effect mimics the firing signal outputted by comparator 62 and causes OR gate 66, flip-flops 68 and 72, and the gating circuits to operate in the manner described above to gate thyristor $CR_2$. This operation is based upon the premise that after a long period of time the thyristor which has failed to commutate will cease to conduct, principally due to the cessation of oscillations in the resonant power circuit.

Accordingly, capacitor $C_9$ and flip-flop 112 serve as an automatic time delay and restart circuit for the system. As illustrated at curves 3 through 5 of FIG. 3, the time delay generator flip-flop 68 produces a relatively long pulse (due to the "soft start" feature described above) at time $t_4$ and timer flip-flop 72 responds by producing a trigger pulse. The SCR control flip-flop 84 alternates state in response to the trigger pulse and forwardly-directed current begins to flow through pulse winding 94, as shown in waveform 7. This effects firing of $CR_2$ with the subsequent rising of the output of the current and voltage regulator stage (waveform 10).

In the event that both $CR_1$ and $CR_2$ are caused to conduct simultaneously, or any other fault occurs by which an inordinate amount of current is drawn by the resonant power circuit, the sudden increase in current flowing to the power circuit will be reflected through sense winding 32 and an increased input to the positive terminal of fault sensor comparator 108. The increase causes the comparator to change state, applying a relatively positive voltage to reset terminal R of fault shutdown flip-flop 110. As a result, a signal is applied to the reset terminal R of flip-flop 72 which inhibits the latter so that no further trigger pulses can be outputted until the fault is cleared. In this "fault shutdown" condition pulses are continually applied to the fault shutdown flip-flop 110 from reset flip-flop 112, by virtue of the periodic charging of capacitor $C_9$ through resistor $R_{11}$. The signals are applied to the CLK terminal of flip-flop 110 to cause the latter to change state in the absence of a continued, positive-going reset pulse. Accordingly, an automatic restart function is provided for re-energizing the battery charger system after the fault is cleared.

As will be evident from the foregoing description certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A battery charging circuit of the series resonant type including a resonant circuit adapted to be coupled to a battery for charging the battery and first and second thyristors connected in the resonant circuit for alternately supplying current to said circuit, and a control for selectively operating said thyristors, comprising:
   sensing means for sensing current flowing in the resonant circuit;
   fault anticipation means coupled to said sensing means and responsive to the magnitude of the sensed current for outputting a firing signal in response to the attainment by the sensed current of a first, higher level and the subsequent diminution of said current below a second, lower level;
   a variable time delay stage coupled to said fault anticipation means for outputting a trigger signal a determinable period of time after receipt of said firing signal;
   gating means operated by said variable time delay stage for alternately enabling said first and second thyristors; and
   controller means coupled to said variable time delay stage for varying the point at which said trigger signal occurs.

2. A system according to claim 1, further including controller means adapted to be coupled to a battery under charge for representing the voltage thereacross, said controller means comprising means responsive to the level of said voltage and to the average level of the current in the resonant circuit for increasing the rate at which trigger signals are produced in response to the presence of resonant circuit current or battery voltage below a minimum value, and decreasing the rate at which trigger signals are produced in response to the presence of resonant circuit current or battery voltage above a predetermined value.

3. A system according to claim 1, wherein said fault anticipation means exhibits hysteresis in changing state in a first direction in response to a second, lower input signal and subsequently changing state in an opposing direction in response to a first, higher input signal which is substantially greater than said second, lower input signal substantially greater than said second, lower input signal.

4. A system according to claim 3, further including second time delay means coupled to said fault anticipation means and responsive to the non-production of a firing signal within a predetermined period of time to apply a restart firing signal to said variable time delay stage.

5. A system according to claim 1, wherein said fault anticipation means comprises a comparator having a first input for receiving a representation of current sensed in said resonant circuit; a second input for receiving a reference voltage; and a feedback loop comprising inverting means coupling the output of said comparator to said second input;
   whereby said comparator changes from a first to a second state when said sensed current exceeds a first, higher value and maintains said state until said sensed current diminishes beneath a second, lower value, said lower value being substantially less than said higher value.

6. A system according to claim 1, further including second current sensing means for sensing current flowing to said resonant circuit from a power supply; and
   inhibiting means coupled to said second current sensing means and responsive to the attainment by said input current of a predetermined, maximum value to inhibit said trigger signal.

7. A system according to claim 6, further including second time delay means coupled to said fault anticipation means and responsive to the non-production of a firing signal in a given period of time to apply a restart firing signal to said variable time delay stage.

8. A system according to claim 1, further including a power supply for producing a supply voltage and for producing a biasing voltage for elements of said control, further including shutdown means coupled to said power supply for inhibiting operation of said gating means upon the diminution of said supply voltage with respect to said biasing voltage.

9. A system according to claim 1, wherein said gating means comprises at least one pair of complementary driver transistors; the parallel combination of first and second pulse transformers for gating said first and second thyristors, respectively; and
   means for alternately energizing ones of said driver transistors to alternately reverse current flow through said pulse transformers.

10. A battery charging system of the series resonant type including a resonant circuit adapted to be coupled to a battery for charging the battery and further including first and second thyristors connected in the resonant circuit for alternately supplying current to said resonant circuit, and a control for selectively operating said thyristors, comprising:

sensing means for sensing current flowing in said resonant circuit;

fault anticipation means coupled to said sensing means and operative to output a firing signal subsequent to the attainment by the sensed current of a first, minimum value; and gating means coupled to said fault anticipation means for alternately enabling said first and second thyristors in response to alternate ones of said firing signals.

11. A system according to claim 10, further including a first time delay generator stage coupled to said fault anticipation means for outputting a trigger signal a variable period of time after receipt of said firing signal.

12. A system according to claim 11, further including voltage sensing means adapted to be coupled to the battery; and time delay controller means coupled to said voltage sensing means and to said time delay generator for increasing the delay between said firing signal and said trigger signal in response to an increase in resonant circuit current or battery voltage, and for decreasing the delay between said firing signal and said trigger signal in response to a decrease in resonant circuit current or battery voltage.

13. A system according to claim 10, wherein said fault anticipation means is responsive to the diminution of resonant circuit current subsequent to each attainment of said first, higher level to produce said firing signal.

14. A system according to claim 11, further including second current sensing means for sensing current flowing to said resonant circuit from a power source; and inhibit means coupled to said second sensing means and to said control circuit and responsive to the sensing of current flow above a predetermined maximum for inhibiting the production of said triggering signal.

15. A system according to claim 14, further including second time delay means coupled to said fault anticipation means and inhibited by the production of said firing signal within a predetermined period, said second time delay circuit being operable to produce a restart firing signal in the absence of a firing signal outputted by said fault anticipation means within said predetermined period.

16. A battery charging system of the series resonant type including a resonant circuit adapted to be coupled to a battery for charging the battery and first and second thyristors connected in the resonant circuit for alternately supplying current to said resonant circuit, and a control for selectively operating said thyristors comprising:

first current sensing means for sensing current flowing in said resonant circuit;

fault anticipation means coupled to said sensing means and responsive to the magnitude of the sensed current for outputting a firing signal in response to the diminution of said current below a predetermined, low level;

a variable time delay stage coupled to said fault anticipation means for outputting a trigger signal a determinable period of time after receipt of said firing signal;

gating means operated by said variable time delay stage for alternately enabling said first and said second thyristors; and controller means coupled to said variable time delay stage for varying the point at which said trigger signal is produced.

17. A system according to claim 16, further including voltage sensing means adapted to be coupled to a battery being charged; and said controller being coupled to said voltage sensing means and to said current sensing means for increasing the period of time between said firing signal and said trigger signal in response to the sensing of resonant circuit current or battery voltage above predetermined values; and for decreasing the period of time between said firing and said trigger signals in response to the sensing of resonant circuit current or battery voltage below a predetermined minimum.

18. A system according to claim 17, wherein said fault anticipation means display a hysteresis characteristic in changing state in a first sense in response to the attainment by sensed current of a first, higher level and changing state in the opposite sense in response to the attainment of said current of a second, lower level which is substantially less than said first, higher level.

19. A system according to claim 18, further including second time delay means coupled to said fault anticipation means and disabled by periodic firing signals outputted by said fault anticipation means, said second time delay means being operative in the absence of said firing signals to apply a restart firing signal to said variable time delay stage.

20. A system according to claim 19, further including power supply means for deriving a first, supply voltage, and further deriving a biasing voltage therefrom; and means coupled to said power supply and to said gating means for inhibiting said gating means when the difference between said first, supply voltage and said biasing voltage diminishes beyond a fixed value.

21. A system according to claim 18, wherein said gating means includes first and second pulse transformers coupled to gating terminals of said first and said second thyristors, responsively; and bilateral drive means for alternating current flow direction through said pulse transformer windings, said pulse transformer windings being coupled in reverse parallel relationship across said bilateral drive means.

* * * * *